United States Patent Office 3,697,487
Patented Oct. 10, 1972

3,697,487
RECOVERY OF DILUENT IN ARYLENE SULFIDE POLYMER PRODUCTION
Martin R. Cines, Bartlesville, Okla., assignor to Phillips Petroleum Company
No Drawing. Filed May 5, 1971, Ser. No. 140,567
Int. Cl. C08g 23/00
U.S. Cl. 260—79.1
6 Claims

ABSTRACT OF THE DISCLOSURE

A polar organic diluent selected from amides and sulfones is extracted from an aqueous reaction mixture solid slurry. In the production of arylene sulfide polymers by the reaction of a polyhalo-substituted aromatic compound with an alkali metal sulfide in a polar organic diluent, the polar organic diluent is recovered by extraction with a solvent of the aqueous mixture of reaction effluent solids and polar organic diluent. In a preferred embodiment N-methyl-2-pyrrolidone is recovered from the aqueous reaction mixture solid slurry by extraction with a solvent such as dichloromethane or benzene.

BACKGROUND OF INVENTION

This invention relates to processes for the production of polymers from aromatic compounds. In one of its aspects, this invention relates to processes for the production of arylene sulfide polymers. In another of its aspects, this invention relates to the separation of solid and liquid components of the reaction mixture of the reaction of polyhalo-substituted aromatic compounds with alkali metal sulfide in a polar organic solvent. In still another of its aspects, this invention relates to the extraction of polar compound from aqueous solutions. In yet another of its aspects, this invention relates to the recovery of the polar diluent from the reaction mixture of the reaction of polyhalo-substituted aromatic compounds with an alkali metal sulfide in a polar organic solvent.

In one concept of the invention it provides a method for recovering a polar organic diluent from an aqueous solution by extraction with specified compounds. In another of its concepts this invention provides a method for recovering a polar organic diluent from the aqueous reaction mixture solid slurry of the reaction of a polyhalo-substituted aromatic compound with an alkali metal sulfide in a polar organic diluent by extraction of the polar organic diluent from the slurry in the presence of the solid reaction product. In still another of its concepts, this invention provides a method for facilitating the recovery of arylene sulfide polymers from their reaction product slurry by removal of the polar organic diluent from the reaction slurry prior to separation of the solids from the slurry.

A process for the production of arylene sulfide polymers from polyhalo-substituted cyclic compounds containing unsaturation between adjacent ring atoms, wherein the halogen atoms are attached to ring carbon atoms with an alkali metal sulfide and a polar organic compound at an elevated temperature is disclosed in U.S. 3,354,129. To make such a process commercially desirable, suitable means must be found for recovery of the organic solvent used in the process. Various known processes and combinations of processes for recovery of a polar organic solvent from a reaction mixture can be proposed. However, the order in which the combination of steps is performed is important in yielding commercially acceptable results.

It has long been accepted that the separation of poly (arylene sulfide) and the polar organic diluent from an aqueous reaction mixture solid slurry is a difficult operation. Any process for removing the solids material from a slurry containing the polar organic diluent results in retention of enough of the polar organic diluent in the solids removed that the solids must be described as tacky or sticky. Removal of the retained diluent by further treatment of the solids is rendered more difficult by the cohesive character that the retained diluent imparts to the solids. Filtration of the polymer solids is particularly difficult because the gummy filter cake formed tends to plug the filtering apparatus.

Accordingly, it is an object of this invention to provide a method for recovering the polar organic solvent from the aqueous reaction mixture solid slurry produced in the reaction of polyhalo-substituted aromatic compounds with an alkali metal sulfide in a polar organic diluent before the reaction mixture solids are removed from the aqueous slurry.

It is another object of this invention to provide a more economical method for maximizing the recovery of polar organic diluent from the reaction mixture of the reaction of polyhalo-substituted aromatic compounds with an alkali metal sulfide in a polar organic diluent.

It is still another object of this invention to provide a method for separating the solid and liquid materials of the reaction mixture of polyhalo-substituted aromatic compounds with an alkali metal sulfide in a polar organic diluent.

Other aspects, objects and advantages of this invention will be apparent to one skilled in the art upon reading the specification and the appended claims.

SUMMARY OF INVENTION

In accordance with this invention, a polar organic diluent chosen from among amides and sulfones is recovered from an aqueous reaction mixture solid slurry from the reaction of polyhalo-substituted aromatic compounds with an alkali metal sulfide in a polar organic diluent using an extractant selected from among dichloromethane and benzene.

In accordance with an embodiment of this invention, in the production of arylene sulfide polymers by the reaction of polyhalo-substituted aromatic compounds with an alkali metal sulfide in a polar organic diluent, the aqueous reaction mixture solid slurry produced by dilution of the reaction mixture with water is extracted with a selected organic extractant, the organic phase is separated from the aqueous phase formed in the extraction, and the polar organic diluent is separated from the organic extractant.

In accordance with another embodiment of this invention, the organic phase and the aqueous phase produced by the extraction of the aqueous reaction mixture solid slurry using a selected organic extractant are separated and the aqueous phase is further treated to separate the reaction mixture solids from the water diluent.

The process of this invention is particularly useful in the recovery of polar organic diluent employed in the production of arylene sulfide polymers by the process of U.S. 3,354,129. In the process of that patent the polyhalo-substituted compounds which can be employed as primary reactants in the process are represented by the formulas:

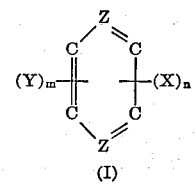

(I)

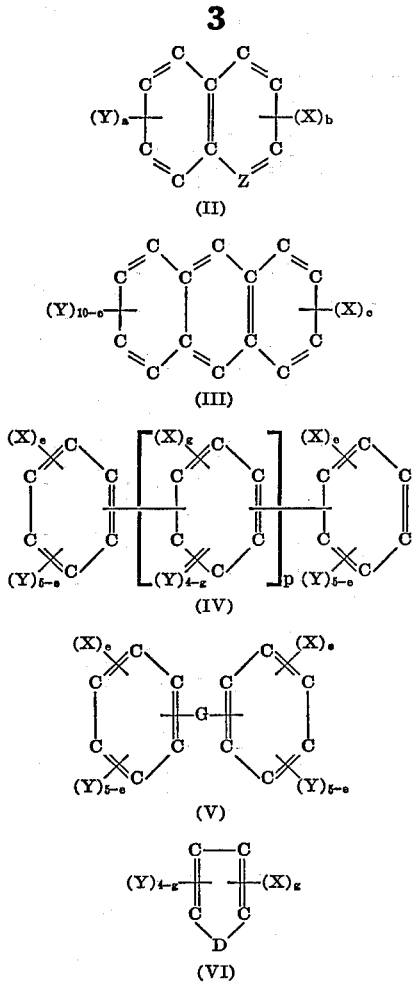

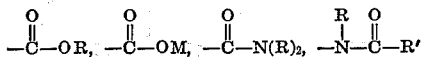

wherein each X is a halogen selected from the group consisting of chlorine, bromine, iodine, and fluorine, preferably chlorine and bromine, each Y is selected from the group consisting of hydrogen, —R—, —N(R)$_2$,

—O—R', —S—R', —SO$_3$H and —SO$_3$M, wherein each R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of N and C; D is selected from the group consisting of O, S, and $$\underset{N}{\overset{R}{|}}$$

G is selected from the group consisting of

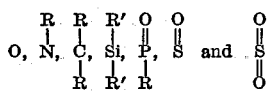

M is an alkali metal selected from the group consisting of sodium, potassium, lithium, rubidium, and cesium; $n$ is a whole integer of from 2 to 6, inclusive; when both Z's in Formula I are C, $m=6-n$, when one Z in Formula I is C, $m=5-n$, when both Z's in Formula I are N, $$m=4-n$$

$b$ is a whole integer of from 2 to 8, inclusive, when Z in Formula II is C, $a=8-b$, when Z is Formula II is N, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of the patent are represented by the formula M$_2$S wherein M is as defined above, and includes the monosulfides of sodium, potassium, lithium, rubidium and cesium, including the anhydrous and hydrated forms of these sulfides. The preferred sulfide reactant is Na$_2$S and its hydrates. This sulfide can be purchased having 9 mols of water of hydration per mol of Na$_2$S, or it can be obtained containing about 60–62 weight percent Na$_2$S and about 38–40 weight percent water of hydration.

The polar organic compounds which are employed as reaction media in the process of the patent should be solvents for the polyhaloaromatic compounds and the alkali metal sulfides. Representative examples of suitable classes of compounds include amides, including lactams; sulfones; and the like. Specific examples of such compounds are hexamethylphosphoramide, tetramethylurea, N,N'-ethylene dipyrrolidone, N-methyl-2-pyrrolidone (NMP), pyrrolidone, caprolactam, N-ethylcaprolactam, sulfolane, dimethylacetamide, low molecular weight polyamides and the like. The polar organic diluent presently preferred is N-methyl-2-pyrrolidone (NMP).

In a preferred embodiment, the polymerization reaction effluent comprising arylene sulfide polymer, alkali metal halide, polar organic diluent, and minor amounts of impurities is mixed with an amount of water sufficient to provide 0.01 to 100, preferably 1 to 20, parts by weight water per part of weight polar organic diluent. This forms an aqueous reaction mixture solid slurry which is then extracted. The preferred extractants are dichloromethane and benzene.

Suitability of the above extractants in the process of this invention is based on a number of characteristics of the extractants. These extractants have (1) a low solubility in water and in aqueous alkali metal halide solutions, (2) a large distribution coefficient for the polar organic solvent to be extracted so that large quantities of extractant are not required, (3) a relatively low cost, (4) a reasonable heat of vaporization to allow a saving in heat requirement over vaporization of the water present, (5) distillation characteristics to permit relatively easy separation from polar organic solvent, and (6) a density sufficiently different from that of the aqueous solution to permit good phase separation.

The weight ratio of extractant to aqueous solution generally is within the range of about 1:1 to 40:1, preferably about 1:1 to 25:1. Although the extraction can be carried out over a broad temperature range, the extraction temperature generally will be within the range of about 0–200° C., preferably about 20–100° C. Although elevated pressures, e.g., pressures up to about 20 atmospheres or more, can be employed, substantially atmospheric pressure is preferred. In any event, the pressure should be sufficient to maintain the components of the system substantially in the liquid phase. Although the extraction can be carried out batchwise, e.g., in a multiple extraction process, extraction in a continuous process is preferred.

The method for separating the polar organic diluent from the extractant can vary depending on the diluent and extractant used. The usual method of separation is distillation, the techniques for which are so well known that discussion here is not necessary. As mentioned above one of the criteria for choosing a suitable extractant for this process is distillation characteristics to permit relatively easy separation of the polar organic solvent from the extractant.

Separation of the organic phase of the extraction process containing the organic extractant, the polar organic diluent, and liquid organic impurities from the reaction mixture the aqueous phase remaining contains water, arylene sulfide polymer, and alkali metal halide. Separation of the solid polymer from this salt water solution can be easily accomplished by filtration, centrifugation, or evaporation. The presently preferred method is by filtration which produces a solid polymer particulate filter cake without the stickiness attributed to polar organic diluent contamination and which can easily be washed free of alkali metal halide or other solid contaminants.

The following specific examples are offered to show the effectivenes of the extractants chosen for accomplishing the extraction of the polar organic diluent from the aqueous reaction mixture solid slurry by the process of this invention. These examples are meant to be illustrative and are not exclusive.

EXAMPLE I

A typical reactor effluent from the reaction of a polyhalo-substituted aromatic compound with a sodium sulfide in N-methyl-2-pyrrolidone (NMP) composed of 61.5 weight percent of NMP, 18.2 weight percent of sodium chloride, 16.8 weight percent of poly(arylene sulfide), 0.2 weight percent of p-dichlorobenzene, and 3.3 weight percent of water at 256° C. was mixed with water at 26° C. in a stirred vessel to produce an aqueous reaction mixture solid slurry at 55° C. which was about 75 percent water by weight. This aqueous solid slurry was extracted with dichloromethane by adding extracting agent of about 2.5 times the weight of the slurry to the slurry mixture with agitation and then allowing phase separation at a temperature of about 37° C. The NMP, the p-dichlorobenzene, and about 2 percent of the total water were removed in the extract along with the dichloromethane. The sodium chloride, the poly(arylene sulfide), and about 0.2 percent of the dichloromethane were removed in the raffinate with water. The dichloromethane and NMP were then separated by distillation and the poly(arylene sulfide) solids were filtered from the aqueous phase.

EXAMPLE II

The reactor effluent and water were combined as in Example I to form an aqueous reaction mixture solid slurry. This slurry was extracted with benzene by adding extracting agent of about 22 times the weight of the slurry to the slurry mixture with agitation and then allowing phase separation as in Example I. The NMP, the p-dichlorobenzene and about 0.4 percent of the water were removed with the benzene as extract. The sodium chloride, the arylene sulfide polymer and a negligible amount of benzene were removed with the water as raffinate. The benzene and NMP were then separated by distillation and the poly(arylene sulfide) solids were filtered from the aqueous phase.

The examples above illustrate that a polar organic diluent can be extracted from an aqueous reaction mixture solid slurry produced in the reaction of a polyhalo-substituted aromatic compound with an alkali metal sulfide in a polar organic diluent.

Reasonable variation and modification are possible within the cope of the foregoing disclosures and the appended claims of the invention the essence of which is that there has been provided a method for recovering a polar organic diluent from an aqueous reaction mixture solid slurry by extraction with specified chemical compounds.

I claim:

1. A method for recovering polar organic diluent selected from the group consisting of amides and sulfones from an aqueous reaction mixture solids slurry obtained by reacting a polyhalo-substituted aromatic compound and an alkali metal sulfide in a polar organic diluent selected from the group consisting of amides and sulfones with subsequent slurrying by water dilution, which method comprises:
   (a) extracting said reaction mixture slurry with a solvent selected from dichloromethane and benzene to obtain (1) an aqueous phase comprising water and reaction mixture solids and (2) an organic phase comprising said solvent and said polar organic diluent,
   (b) separating the organic phase from the aqueous phase, and
   (c) separating the extracted polar organic diluent from the extractant.

2. The method of claim 1 wherein the extracted polar organic diluent is separated from the extractant by distillation.

3. The method of claim 1 wherein the reaction mixture solids are polymers of arylene sulfide.

4. The method of claim 1 wherein the polar organic diluent is N-methyl-2-pyrrolidone.

5. The method of claim 1 wherein extraction of the aqueous reaction mixture solid slurry which comprises an amount of water sufficient to provide 0.01 to 100 parts by weight water per part by weight polar organic diluent is accomplished at a ratio of 1:1 to 40:1 weight ratio of extractant to aqueous solution within a temperature range of about 0 to 200° C. and at a pressure in the range of 1 to 20 atmopheres.

6. A method by the process of claim 1 for recovering reaction solids from an aqueous reaction mixture solids slurry comprising further treatment of the extraction aqueous phase comprising:
   (a) separating said aqueous phase from said organic phase, and
   (b) separating the reaction mixture solids from the water diluent by centrifugation, filtration or evaporation.

References Cited

UNITED STATES PATENTS 3,354,129  11/1967  Edmonds, Jr., et al. ____ 260—79
3,446,797  5/1969   Focella et al. _____ 260—239.3

DONALD E. CZAJA, Primary Examiner

M. I. MARQUIS, Assistant Examiner

U.S. Cl. X.R.

260—79, 239.3 A, 326.5 FN, 551 P, 561 R, 607 A